US011924592B2

(12) United States Patent
Calabretta et al.

(10) Patent No.: US 11,924,592 B2
(45) Date of Patent: Mar. 5, 2024

(54) FAST FLOW-CONTROLLED AND CLOCK-DISTRIBUTED OPTICAL SWITCHING SYSTEM FOR OPTICAL DATA CENTER NETWORK

(71) Applicant: TECHNISCHE UNIVERSITEIT EINDHOVEN, Eindhoven (NL)

(72) Inventors: Nicola Calabretta, Eindhoven (NL); Xuwei Xue, Eindhoven (NL)

(73) Assignee: TECHNISCHE UNIVERSITEIT EINDHOVEN, Eindhoven (NL)

(*) Notice: Subject to any disclaimer, the term of this patent is extended or adjusted under 35 U.S.C. 154(b) by 30 days.

(21) Appl. No.: 17/613,627

(22) PCT Filed: May 28, 2020

(86) PCT No.: PCT/EP2020/064850
§ 371 (c)(1),
(2) Date: Nov. 23, 2021

(87) PCT Pub. No.: WO2020/239916
PCT Pub. Date: Dec. 3, 2020

(65) Prior Publication Data
US 2022/0256261 A1   Aug. 11, 2022

Related U.S. Application Data

(60) Provisional application No. 62/853,320, filed on May 28, 2019.

(51) Int. Cl.
*H04Q 11/00*   (2006.01)
(52) U.S. Cl.
CPC .................. *H04Q 11/0005* (2013.01)
(58) Field of Classification Search
CPC .................................... H04Q 11/0005
See application file for complete search history.

(56) References Cited

U.S. PATENT DOCUMENTS

| 10,277,385 B1* | 4/2019 | Anandan | H04L 12/40 |
| 2014/0334821 A1* | 11/2014 | Mehrvar | H04Q 11/0066 398/54 |
| 2020/0112515 A1* | 4/2020 | Brar | H04L 63/10 |

FOREIGN PATENT DOCUMENTS

WO   2018143127 A1   8/2018

OTHER PUBLICATIONS

International Search Report dated Oct. 7, 2020 for PCT/EP2020/064850.

(Continued)

*Primary Examiner* — Shi K Li
(74) *Attorney, Agent, or Firm* — Suiter Swantz pc llo

(57) ABSTRACT

A method of operating an optical switch (1) arranged in an optical DCN (2), comprising:
providing first and second NIC's (3, 10), having first and second label channel parts (5, 12) and first and second data channel parts (6, 13), configured in a first and second ToR (7, 14) of a first and second server rack (8, 15),
arranging an optical switch communicating with the first and second data channel parts via first and second data channels (16, 17),
configuring a switch controller (18) communicating with the first and second label channel parts via first and second label channels (19, 20),
transmitting destination information of data packets (30) carried by paired label packets (31) to the switch controller,
transmitting data packets to the optical switch,
generating signals (45) to configure the optical switch, and
sending the data packets to a destination port.

13 Claims, 5 Drawing Sheets

(56) References Cited

OTHER PUBLICATIONS

Yan, Fulong et al., "Novel Flat Data Center Network Architecture Based on Optical Switches With Fast Flow Control", IEEE Photonics Journal, IEEE, US, vol. 8, No. 2, Apr. 1, 2016, pp. 1-10.
Yan, Fulong et al., "Performance Assessment of a Novel HPC Network Architecture Based on Fast Optical Switches with HPC Application Traffics", 2018 Photonics in Switching and Computing (PSC), IEEE, Sep. 19, 2018, pp. 1-3.

* cited by examiner

FAST FLOW-CONTROLLED AND CLOCK-DISTRIBUTED OPTICAL SWITCHING SYSTEM FOR OPTICAL DATA CENTER NETWORK

FIELD OF THE INVENTION

This invention relates to methods, devices and systems with optical switching systems for optical data center networks (DCN).

BACKGROUND OF THE INVENTION

Up to now, no optical DCN's with nanoseconds switching time have been implemented due to the absence of a fast switch-controlling mechanism.

Burst mode receivers supply a solution to quickly recover the correct data. However, the high cost and power consumption make burst mode receivers impractical to be utilized in large-scale DCN's, where most applications generate packets of short traffic and low cost and power consumption are critical requirements.

After distributing the clock frequency, clock phase caching between transmitters (TX's) and receivers (RX's) assists to achieve the fast clock and data recovery at receivers. However, the clock phase is affected a lot by the temperature making it hard to maintain the stable phase between the TX's and RX's. Moreover, the complicated phase caching management between TX's and RX's makes it impossible to be deployed in a DCN, i.e. when connecting TX's and RX's on a large scale.

Optical buffers based on Optical Fiber Delay Lines (FDL's) and wavelength conversion as well as deflection routing techniques could be used to mitigate packet loss when packet contentions happen. However, the power and quality of these routed signals are easily deteriorated, thereby resulting in limited and fixed buffering time, and therefore impractical to be deployed in real-life.

A White Rabbit protocol can be utilized to unify network time, which is necessary to synchronize the label packets and paired data packets. However, a White Rabbit protocol is designed for a network with long-distance edge nodes, which is not suitable for an optical DCN that has critical requirements regarding deployment in view of time synchronization. Up to now, there are no practical techniques to synchronize the label packets and paired label packets within the required nanoseconds level.

It is therefore an object of the invention to provide a fast switch-controlling mechanism allowing the use of optical DCN's with nanoseconds switching time.

SUMMARY OF THE INVENTION

According to the invention, a method of operating an optical switch arranged in an optical data centre network (DCN) is provided, comprising the steps of:
providing a first network interface card (NIC), for instance associated with a first Ethernet switch, having a first label channel part and a first data channel part, configured in a first top of rack (ToR) of a first server rack comprising multiple servers,
providing a second NIC, for instance associated with a second Ethernet switch, having a second label channel part and a second data channel part, configured in a second ToR of a second server rack comprising multiple servers,
arranging an optical switch in communication with the first data channel part via a first data channel and the second data channel part via a second data channel,
configuring a switch controller in communication with the first label channel part via a first label channel and the second label channel part via a second label channel,
transmitting, by the first and/or second label channels, destination information of data packets carried by paired label packets to the switch controller from the first and/or second NIC,
transmitting, by the first and/or second data channels, data packets aggregated by the first and/or second NIC to the optical switch from the first and/or second NIC,
generating, by the switch controller, switch-enabling signals to configure the optical switch based on received label destination information, and
configuring the optical switch to send the data packets to a destination port.

Operation of the control system is thus achieved by implementing the above control system in network interface cards (NICs) and switch controllers. The NIC is located in the top of the rack (ToR). The NIC includes a label processing part connected to the switch controller and a data processing part connected to the optical switch.

As stated before, one of the problems in optical switches for optical data center networks is related to the lack of fast control mechanisms to match the fast-optical switches. With this invention, a fast (nanoseconds) controlling mechanism for an optical intra-data center network (DCN) is provided, which enables the deployment of fast optical switches in data centers (DC). The method could in principle also be used for high-performance computing (HPC).

An embodiment relates to an aforementioned method, wherein, when data packet contentions occur, i.e. data packets coming from different racks have the same destination, an Optical Flow Control (OFC) protocol between the switch controller and the NIC's is utilized to solve contentions, avoiding packet loss, the OFC comprising:
storing the data packets in an electrical buffer at the first and/or second NIC, and
generating and sending, by the switch controller, an acknowledged (ACK) signal in case of successful forwarding to the first and/or second NIC using the first and/or second label channels, and
generating and sending, by the switch controller, a not-acknowledged (NACK) signal in case of dropping to the first and/or second NIC using the first and/or second label channels,
wherein, once the first and/or second NIC receives the ACK signal, a stored data packet is released from the buffer, while in response to receiving the NACK signal, the stored data packet is retransmitted until the first and/or second NIC receive an ACK signal.

An embodiment relates to an aforementioned method, further comprising:
using the first and/or second label channels to distribute clock frequency information indicated by the ACK/NACK signals from the switch controller to the first and/or second NIC, wherein the first and/or second NIC uses the clock frequency information to drive the delivering of data packets on the first and/or second paired data channels.

An embodiment relates to an aforementioned method used to implement Automatic Channel Synchronization enabling slotted network operation.

An embodiment relates to an aforementioned method, wherein the clock frequency information is embedded in the ACK and NACK signals transmitted by the switch controller to the first and/or second NIC.

An embodiment relates to an aforementioned method, wherein rising and/or falling edges of the ACK and NACK signals comprise the clock frequency information.

The packets gap and idle parts of the data packets (due to the lower traffic load) are inserted with pulse transitions driven by the Local Recovered Clock, also to maintain a continuous traffic with identical clock frequency even after optical switching.

The label channels thus operate an Optical Flow Control (OFC) protocol to prevent packet loss and operate a clock frequency synchronization and time distribution to quickly recover the correct data and synchronize the packets on data channels and label channels.

The Optical Flow Control (OFC) protocol essentially prevents packet loss caused by optical packet contentions and non-existent optical buffers.

Another aspect of the invention relates to an optical switching system for an optical data centre network (DCN), comprising:
  a first network interface card (NIC), for instance associated with a first Ethernet switch, having a first label channel part and a first data channel part, in a first top of rack (ToR) of a first server rack comprising multiple servers,
  a second NIC, for instance associated with a second Ethernet switch, having a second label channel part and a second data channel part, in a second ToR of a second server rack comprising multiple servers,
  an optical switch arranged in communication with the first data channel part via a first data channel and the second data channel part via a second data channel,
  a switch controller configured in communication with the first label channel part via a first label channel and the second label channel part via a second label channel,
  wherein the first and/or second label channels are configured to deliver destination information of data packets carried by paired label packets to the switch controller,
  wherein the first and/or second data channels are configured to transmit data packets aggregated by the first and/or second NIC to the optical switch from the first and/or second NIC,
  wherein the switch controller is configured to generate switch-enabling signals to configure the optical switch based on received label destination information, and
  wherein the optical switch is configured to send the data packets to a destination port.

An embodiment relates to an aforementioned optical switching system, wherein the switch controller is implemented by a circuit, such as an Application-Specific Integrated Circuit (ASIC) on a chip or field-programmable gate array (FPGA).

Yet another aspect of the invention relates to an optical data centre network (DCN) comprising one or more aforementioned optical switching systems.

Thus, fast (within 3.104 ns) and cost-effective recovery of correct data at receivers is provided, by synchronizing the network clock frequency without deploying expensive and power hunger burst mode receivers. As stated, largescale deployment of burst mode receivers for fast receipt of correct data bears a heavy burden in view of cost and energy.

Dynamic synchronization of label packets and paired data packets is provided, because it is not possible in the prior art to dynamically synchronize the packets on two channels within a nanoseconds time frame.

The NIC can be attached to any edge node (such as ToR, blade with multiple micro-servers, and even server) of the current electrical switching DCN's.

The NIC supports not only the Ethernet protocol, but also other protocols, such as InfiniBand (or any other protocol).

Yet another aspect of the invention concerns a server, comprising:
  a network interface card (NIC), for instance associated with an Ethernet switch, having
    a label channel part configured for communication with a switch controller via a label channel, wherein the label channel is configured to deliver destination information of data packets carried by paired label packets to the switch controller from the NIC, and
    a data channel part configured for communication with an optical switch via a data channel, wherein the data channel is configured to transmit data packets aggregated by the NIC to the optical switch from the NIC,
  wherein the switch controller is configured to generate switch-enabling signals to configure the optical switch based on received label destination information, and
  wherein the optical switch is configured to send the data packets to a destination port.

An embodiment relates to an aforementioned server, wherein the server is configured to be top of rack (ToR) of a server rack comprising multiple servers.

An embodiment relates to an aforementioned server, configured for use in an aforementioned method, an aforementioned optical switching system and/or an aforementioned optical data centre network.

DETAILED DESCRIPTION

Figure 1:
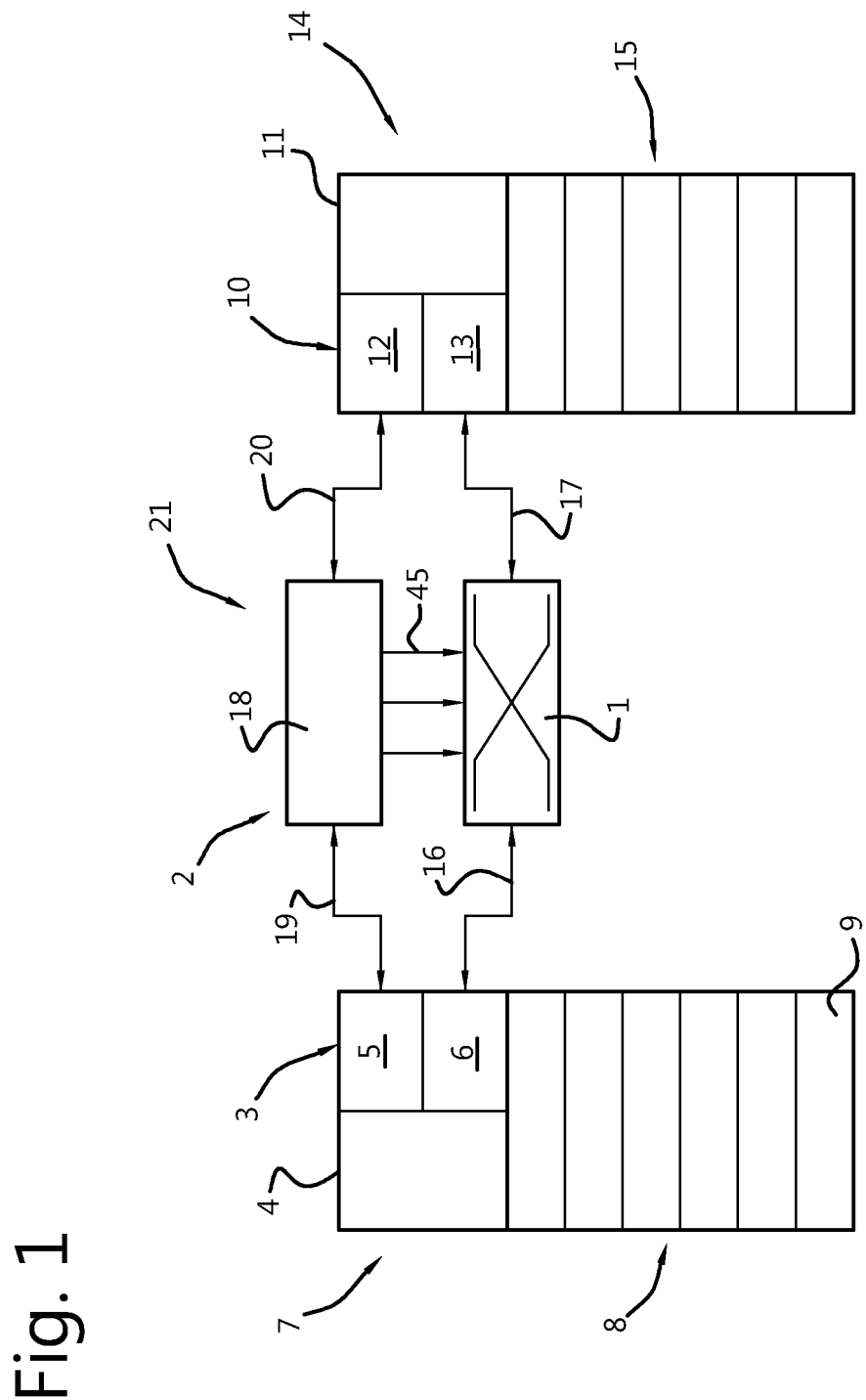
FIG. 1 shows a fast controlling mechanism for an optical DCN.

The switch controller 18 can be implemented by a circuit e.g., an ASIC circuit on a chip scale. As shown in FIG. 1, the destination information of the data packets carried by the paired label packets are delivered to the switch controller 18 of the optical switch 1 via the label channels 19, 20. Meanwhile, at the top of rack (ToR) 7, 14, the data packets aggregated by the connected Network Interface Control (NIC) 3, 10 are transmitted to the optical switch 1 from the connected network interface control (NIC) 3, 10 via the data channels 16, 17. Based on the received label destination information, switch-enabling signals 45 are generated by the controller 18 to configure the optical switch 1 and to forward the data packets to the destined ports.

When data packet contentions happen, i.e. data packets coming from different server racks 8, 15 having the same destination, an OFC protocol between switch controller 18 and NIC's 3, 10 is utilized to solve contentions avoiding packets loss. OFC signals (ACK in case of successful forwarding, and NACK in case of dropping) are generated by the switch controller 18 and sent back to the connected NIC's 3, 10. Once the NIC 3, 10 receives an ACK signal, the stored data packet will be released from the ToR buffer 35, while in response to receiving a NACK signal, the stored data packet will be retransmitted until the NIC 3, 10 receives an ACK signal.

Figure 3:
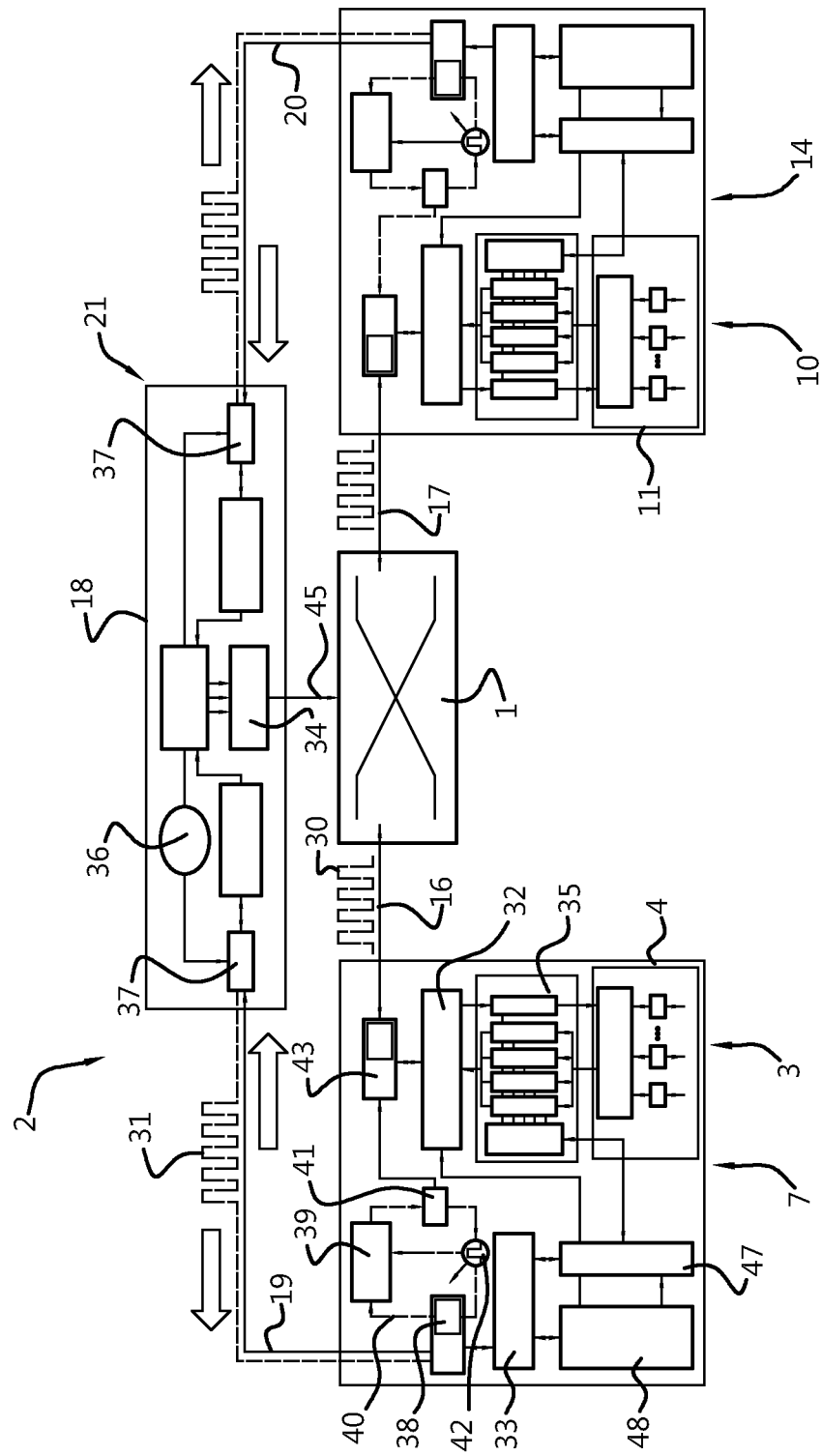
FIG. 3 shows further details of the fast switch-controlling mechanism.

FIG. 3 provides the details of the NIC 3, 10. The label channels 19, 20 are exploited not only to simultaneously transmit the label packets and the OFC signals (ACK/NACK) to implement the fast switch-controlling between ToR's 7, 14 and optical switch controller 18, but they are also utilized to distribute the clock frequency and the synchronization time from the master clock of the central switch controller 18 to all the connected NIC's 3, 10 of the ToR's 7, 14.

The clock frequency information of the switch controller 18 is embedded in the OFC signals (ACK/NACK) transmitted by the central optical switch controller 18 to the NIC's 3, 10. The rising edges and falling edges of the OFC data are sent to all the NIC's 3, 10 along with the transmission of OFC signals. Each NIC 3, 10 recovers the clock of label channels 19, 20 and uses this to drive the data packets 30 on the paired data channels 16, 17. Therefore, all NIC's 3, 10 have the same clock. The bits of the data packets 30 forwarded in the network 2 have the same clock frequency, avoiding burst clock frequency recovery at the receivers.

Moreover, the label channels 19, 20 are utilized to distribute the synchronization time of the central switch controller 18 to all the connected NIC's 3, 10. This is used to synchronize the data packets 30 and label packets 31 transmission slots to achieve a slotted network. Based on this, the data/label packets 30/31 generated from different NIC's 3, 10 can be sent out aligning with the same time slot ruled by the central switch controller 18, which guarantees the synchronization of data packets 30 arriving at the optical switch 1 and the label packets 31 arriving at the switch controller 18, respectively, with huge simplification of data synchronization and clock recovery, and enabling slotted scheduler operation, while achieving a fast (nanoseconds) control mechanism and OFC.

Figure 2:
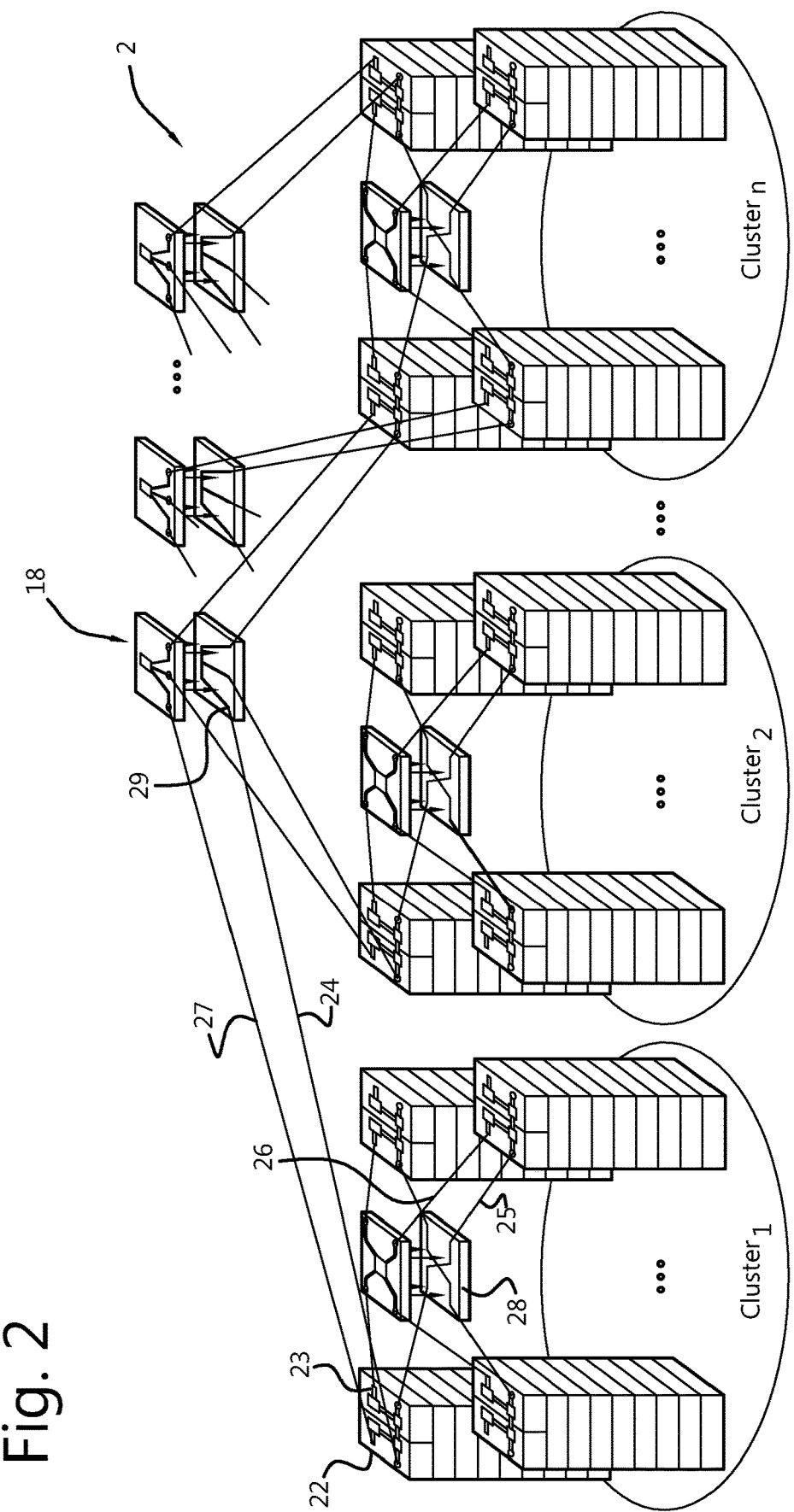
FIG. 2 shows an optical switch-based DCN deploying the fast switch-controlling mechanism.

An optical switches-based DCN 2 deploying the fast switch-controlling mechanism is shown in FIG. 2. The network 2 can be divided into N clusters and each cluster groups N racks where each rack contains K servers. Therefore, the clock frequency synchronization of the whole network 2 can be divided into separate cluster scales. Intra-cluster optical switches (IS) 28 and inter-cluster optical switches (ES) 29 are dedicated for intra-cluster and inter-cluster communication, respectively. The i-th ES interconnects the i-th ToR of each cluster, with i=1, 2, . . . , N, where each ToR has one inter-cluster NIC 22 and one intra-cluster NIC 23. For the deployed fast switch-controlling mechanism, inter-cluster data channels 24 are equipped connecting with the NIC 22 to forward the aggregated data packets crossing the inter-cluster switching networks, and the paired inter-cluster label channels 27 carrying the destination information of the corresponding data packets are connected with the optical switch controller 18 to reconfigure the inter-cluster optical switch 29 and then forwarding the data packets to the destined ports. Note that the intra-cluster interconnect network (consisting of the intra-NICs 23 and intra-cluster switch 28) and the inter-cluster interconnect network (consisting of the inter-NICs 22 and inter-cluster optical switch 29) are two independent sub-networks, respectively. Each sub-network has an independent optical switching and control system with its own label control mechanism, OFC protocol and clock frequency distribution. This is important as the scalability of the optical switching and control system is per cluster scale and not for the whole DCN. This makes the proposed techniques fully distributed and scalable even for DCN with a very large number of ToR's.

FIG. 3 shows further details of the fast switch-controlling mechanism interconnecting FPGA-implemented ToR's, an FPGA-implemented switch controller 18 and fast optical switch 1.

Figure 4:
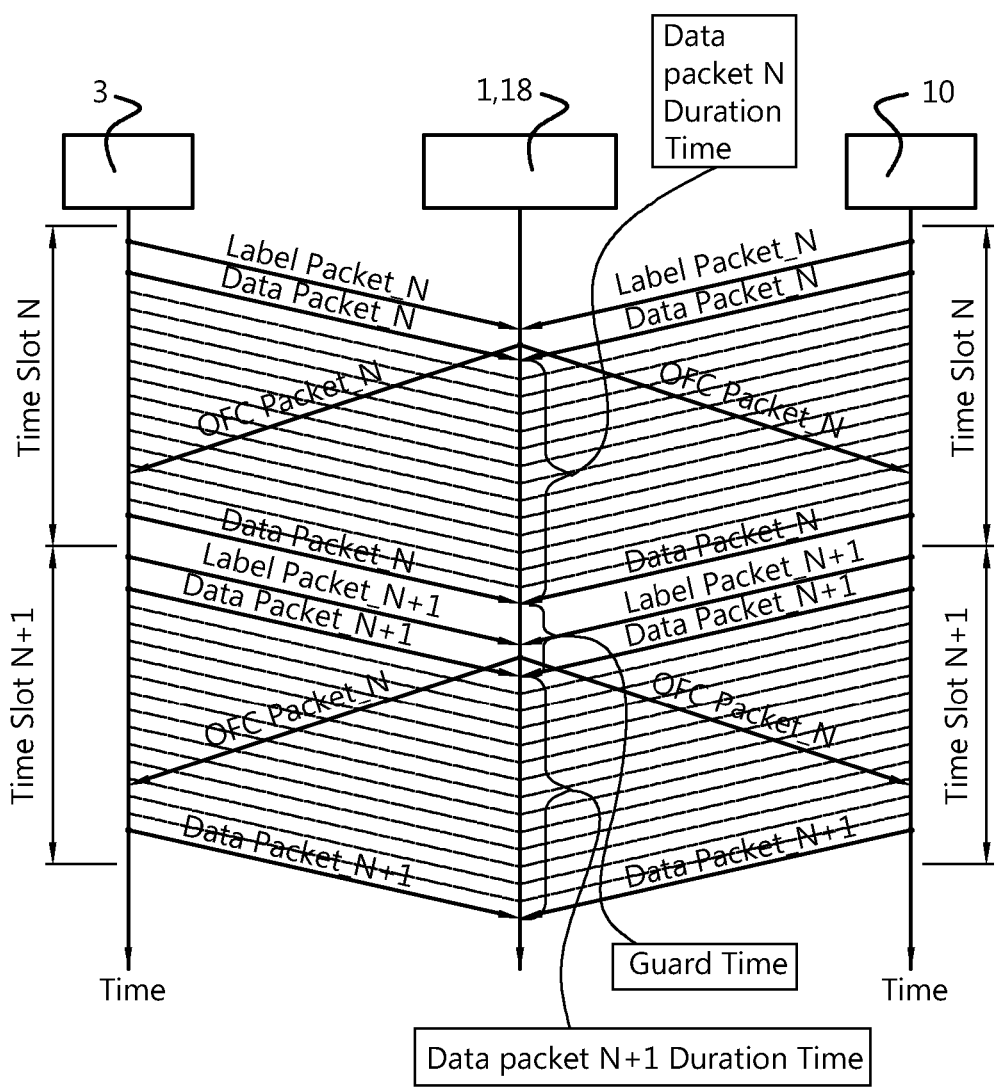
FIG. 4 shows a synchronous slotted system and OFC protocol between NIC's and switch controller.

To fully benefit from fast-optical switches featuring nanoseconds hardware switching speed, a fast switch controlling mechanism to forward the data packets in nanoseconds time scale is proposed and demonstrated. As shown in FIG. 3, the Ethernet frames stored in the ToR buffer 35 are sent to the Payload Packet Aggregator 32 to generate the optical data packets 30 with fixed length (fixed time slot). Simultaneously, optical label packets 31 carrying the optical switch port destination (port request), associated with the optical data packets 30, are generated by the Label Packet Aggregator 33. The optical data packets 30 and optical label packets 31 are simultaneously transmitted by the NIC data channel 16, 17 and label channel 19, 20 interfaces to the optical switch 1 and switch controller 18, respectively. The optical label packets 31 will be processed by the FPGA-based Switch Controller 18, which controls possible packet contentions and reconfigures the optical switch 1 in order to forward the optical data packets 30 to the final destination. The synchronous slotted system has been chosen to align the data packets 30 and label packets 31, mainly due to easier management, higher bandwidth utilization and much fewer contention probabilities. Due to clock distribution, optical label packets 31 and data packets 30 delivered from each of the NICs 3, 10 have the same clock. The time synchronization distribution ruled by the Switch Controller 18 enables the slotted operation of the network 2. The operation procedures of label packets 31 and their corresponding data packets 30 at every time-slot are shown in FIG. 4. Based on the received label packets 31 to solve the packets contention at the Switch Controller 18, switch-enabling signals 45 are generated by the Gate Manager 34 to control the switch gates and the data packets 30 are forwarded to the destined ports.

OFC Protocol to Prevent Packet Loss Caused by Packet Contention

Considering the practical implementation of a fast optical switching DCN 2 with the lack of an optical buffer, an OFC protocol reusing the label channels 19, 20 between the NIC's 3, 10 and the switch controllers 18 is proposed and implemented to avoid packets loss. A packet contentions resolution algorithm is operated according to the received label packets 31 at the Switch Controller 18 to generate dedicated enable signals to control the optical switch 1, thus preventing packet loss. Every time-slot, after solving the packet contentions, OFC packets ((ACK in case of successful forwarding, and NACK in case of dropping)) as shown in FIG. 4 are generated accordingly by the switch controller 18 and sent back to the corresponding NIC's 3, 10 to trigger the release and retransmission of the data packet 30 copy stored in the Buffer 35. As shown in FIG. 3, for successful packet forwarding, an ACK packet will be sent back to the Label Packet Disaggregator 33 by the label channel 19, 20 and then to the Label Processor 47, whereby the data packet 30 copy will be released from the Buffer 35. In response to a NACK packet indicating the packet dropped due to contention, the data packet 30 copy will be retransmitted until receiving ACK feedback. Note that given the proposed optical switching system, the implemented OFC protocol operates in a fully distributed way and reuses the label channels 19, 20, which enhances the scalability and decreases the complexity of the DCN 2 control as well as average latency.

Moreover, the OFC hardware implementation is essential to achieve nanoseconds distributed control between switch controller 18 and NIC's 3, 10, enabling fast (nanoseconds) optical switching and statistical multiplexing. This provides much larger throughput and much lower latency with respect to other proposed slow (milliseconds) optical circuit switch solutions based on slow control plane orchestration.

Clock Frequency Distribution to Enable Fast Clock Data Recovery without Expensive Burst Receivers To quickly and correctly recover the received data packets 30 at the NIC receivers, clock frequency distribution among transmitter-receiver pairs is to be achieved.

Figure 5:
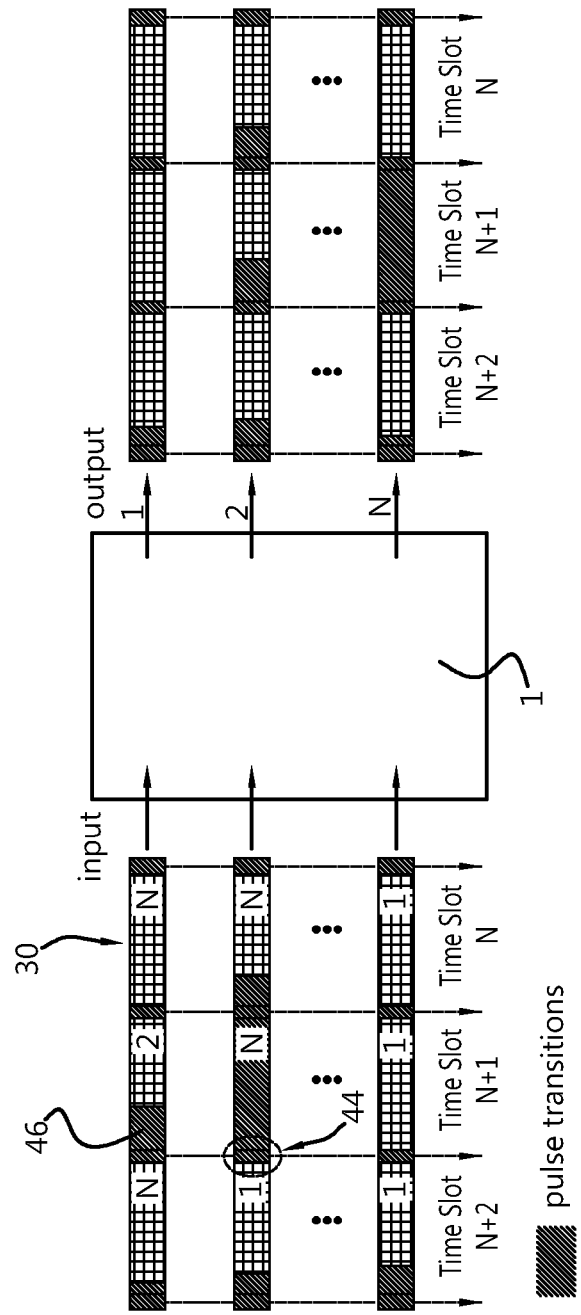

Moreover, inserting data packets gap and idle packets periods with pulse transitions 46 helps to maintain continuous clock frequency synchronization between any connected nodes. As shown in FIG. 3, a physical Clock Source 36 at the Switch Controller 18 is equipped to drive all the transceivers (TRx's) 37 at the controller 18. The bits rising edges and falling edges of OFC packets (ACK/NACK) showing the clock frequency information of the central Switch Controller 18 are sent to all the NIC's 3, 10 via the label channels 19, 20. After the clock data recovery (CDR) blocks 38 inside the TRx's, at Phase Detector 39, the Rx Clock 40 recovered from the incoming label packets 31 is compared with the local clock which is to be "synchronized", to track the clock frequency of the Clock Source 36. The phase error signal to a Phase-Locked Loop (PLL) 41 is used to synchronize the local clock using the recovered Rx Clock 40. The PLL 41 is implemented in software using a Proportional Integrative (PI) controller. The PI controller controls the Electronic Frequency Control (EFC) input of the local oscillator (LO) 42, adjusting the oscillator frequency with a (low-pass filtering) cut-off frequency. As a result, the Local Recovered Clock of the label channels 19, 20 locating at different NIC's 3, 10 is frequency traceable to the same source, the Clock Source 36, without the intervention of the OFC protocol. The Local Recovered Clock is utilized to drive the TRx's 43 of the data channels 16, 17. Therefore, the data packets 30 forwarding among NIC's' transmitter-receiver pairs on the data channels 16, 17 have no clock frequency variation. As shown in FIG. 5, the packets gap and idle parts of the data packets due to the lower traffic load are inserted with pulse transitions 46 driven by the Local Recovered Clock as well to maintain a continuous traffic with the identical clock frequency even after optical switching. Therefore, the continuous traffic without clock frequency variable among data packets eliminates the frequency recovery step at receiver thereby accelerating the clock data recovery (CDR).

Automatic Channel Synchronization to Enable Slotted Network Operation and Label and Data Packets Alignment To synchronize the data packets 30 and paired label packets 31 and achieve a slotted network operation, identical time information is necessary for each NIC 3, 10 to align the sent-out data packets 30 and the paired label packets 31 as the requirement of synchronous slotted system. Due to variable link propagation delays caused by the different fiber length of label 19, 20 and data channels 16, 17, efforts need to be made to adapt the fiber variation and then achieving the identical time for all the NIC's 3, 10 inheriting from the central switch controller 18. Automatic measurement of channel delay in real-time is implemented in this invention to adapt the variable fiber length.

At the initialization stage, the time packets containing timestamps indicating the present local time ($T_{L1}$) of Time Management Center at NIC's are sent to the Switch Controller 18 via the label channels 19, 20. After extracting the time packets at the controller, the timestamps will be sent back to the source Time Management Center. Based on the time offset ($T_{offset}=T_{L2}-T_{L1}$) between the sent-out timestamp ($T_{L1}$) and current NIC time ($T_{L2}$), and the known packet processing ($T_{processing}$) delay including the processing time inside the FPGA-based NIC and Switch Controller 18, the physical fiber transmission delay ($T_{fiber}=(T_{offset}-T_{processing})/2$) of label channels 19, 20 can be automatically measured in real-time even deploying different length fiber.

Once measuring the fiber delay, the switch controller 18 sends the time packets carrying local controller time ($T_{controller}$) information to all the connected roller, NIC's. Once receiving the controller time at each NIC, the current local time of each NIC ($T_{NIC}$) is updated ($T_{NIC}=T_{controller}+T_{fiber}+T_{processing}/2$) by compensating the received controller time with the measured fiber delay and the packets processing time at FPGA. The NIC's connecting with the same controller 18 are then equipped with identical time information. The label packets 31 from different NIC's can be sent out aligning with the time-slot ruled by the Switch Controller 18, guaranteeing all the label packets 31 arriving at the Controller 18 at the same time. Moreover, the fiber deployed for the data channels 16, 17 should be the same length with that deployed in the paired label channels 19, 20, which guarantees the synchronization of label packets 31 and paired data packets 30.

In summary, embodiments provided herein simultaneously demonstrate a fast switch controlling mechanism, optical clock-distribution and synchronization for an optical switches based DCN featuring nanoseconds configuration time without deploying expensive burst mode receivers. In this fast switch controlling system, the network clock frequency and synchronization enable the receivers to receive and recover the correct data within a few nanoseconds without the use of expensive and power hungry burst mode receivers. An OFC protocol is implemented as well for the first time to allow fast and distributed nanoseconds control of the network at the hardware level, preventing packets loss.

This solves the current bottleneck of the availability of optical buffers, thus preventing the use of nanoseconds optical switches in a DC. This prevents packet loss without deploying the unavailable optical buffer. Methods are also provided to automatically measure the fiber transmission delay and dynamically unify the network time to all the edge nodes (NIC's). Therefore, the data packets and label packets can be continuously aligned with the corresponding time-slot, even if the optical fiber lengths between NIC's and optical switch change.

LIST OF REFERENCE NUMERALS

1. Optical switch
2. Optical data centre network (DCN)
3. First NIC
4. First Ethernet switch
5. First label channel part
6. First data channel part
7. First ToR
8. First server rack
9. Server
10. Second NIC
11. Second Ethernet switch
12. Second label channel part
13. Second data channel part 14. Second ToR
15. Second server rack
16. First data channel
17. Second data channel
18. Switch controller
19. First label channel
20. Second label channel
21. Optical switching system
22. Inter-cluster NIC
23. Intra-cluster NIC
24. Inter-cluster data channel
25. Intra-cluster data channel
26. Intra-cluster label channel
27. Inter-cluster label channel
28. Intra-cluster switch
29. Inter-cluster switch
30. Data packet
31. Label packet
32. Payload Packet Aggregator
33. Label Packet Aggregator
34. Gate Manager
35. Buffer
36. Clock source
37. TRx's at controller
38. Clock Data Recovery Block
39. Phase Detector
40. Rx Clock
41. PLL
42. Local oscillator
43. Data channel TRx
44. Data packet gap
45. Switch-enabling signal
46. Pulse transition/idle part of data packet
47. Label processor
48. Time and latency management centre

The invention claimed is:

1. A method of operating an optical switch in an optical data center network (DCN), comprising the steps of:
providing a first network interface card (NIC), having a first label channel part and a first data channel part, configured in a first top of rack (ToR) of a first server rack comprising multiple servers;
providing a second NIC, having a second label channel part and a second data channel part, configured in a second ToR of a second server rack comprising multiple servers;
providing an optical switch in communication with the first data channel part via a first data channel and the second data channel part via a second data channel;
configuring a switch controller in communication with the first label channel part via a first label channel and the second label channel part via a second label channel;
utilizing the first label channel and the second label channel to distribute a clock frequency and synchronization time from a master clock of the switch controller to the first and second NICs;
measuring a physical fiber transmission delay of the first label channel and the second label channel;
compensating the received synchronization time with the measured physical fiber transmission delay;
transmitting, by at least one of the first and second label channels, destination information of data packets carried by paired label packets to the switch controller from at least one of the first and second NIC;
simultaneously transmitting, by at least one of the first and second data channels, data packets aggregated by at least one of the first and second NIC to the optical switch from at least one of the first and second NIC;
generating, by the switch controller, switch-enabling signals to configure the optical switch based on received label destination information; and
configuring the optical switch to send the data packets to a destination port.

2. The method according to claim 1, wherein, when data packet contentions occur, an optical flow control (OFC) protocol between the switch controller and the first and second NICs is utilized to solve contentions, the OFC comprising:
storing the data packets in an electrical buffer at at least one of the first and second NIC;
generating and sending, by the switch controller, an acknowledged (ACK) signal in case of successful forwarding to at least one of the first and second NIC using at least one of the first and second label channels; and
generating and sending, by the switch controller, a not-acknowledged (NACK) signal in case of dropping to at least one of the first and second NIC using at least one of the first and second label channels;
wherein, once at least one of the first and second NIC receives the ACK signal, a stored data packet is released from the buffer, while in response to receiving the NACK signal, the stored data packet is retransmitted until at least one of the first and second NIC receives an ACK signal.

3. The method according to claim 2, further comprising:
using at least one of the first and second label channels to distribute clock frequency information indicated by the ACK/NACK signals from the switch controller to at least one of the first and second NIC, wherein at least one of the first and second NIC uses the clock frequency information to drive the delivering of data packets on at least one of the first and second paired data channels.

4. The method according to claim 3, wherein the method is used to implement automatic channel synchronization (ACS) enabling slotted network operation.

5. The method according to claim 2, wherein the clock frequency information is embedded in the ACK and NACK signals transmitted by the switch controller to at least one of the first and second NIC.

6. The method according to claim 5, wherein at least one of rising and falling edges of the ACK and NACK signals comprise the clock frequency information.

7. An optical switching system for an optical data center network (DCN), comprising:
a first network interface card (NIC), having a first label channel part and a first data channel part, in a first top of rack (ToR) of a first server rack comprising multiple servers;
a second NIC, having a second label channel part and a second data channel part, in a second ToR of a second server rack comprising multiple servers;
an optical switch in communication with the first data channel part via a first data channel and the second data channel part via a second data channel; and
a switch controller in communication with the first label channel part via a first label channel and the second label channel part via a second label channel;
wherein at least one of the first and second label channels is configured to deliver destination information of data packets carried by paired label packets to the switch controller from at least one of the first and second NIC;

wherein at least one of the first and second data channels is configured to simultaneously transmit data packets aggregated by at least one of the first and second NIC to the optical switch from at least one of the first and second NIC;

wherein the switch controller is configured to generate switch-enabling signals to configure the optical switch based on received label destination information;

wherein the optical switch is configured to send the data packets to a destination port; and wherein the system is configured to utilize the first label channel and the second label channel to distribute a clock frequency and synchronization time from a master clock of the switch controller to the first and second NICs, measure a physical fiber transmission delay of the first label channel and the second label channel, and compensate the received synchronization time with the measured physical fiber transmission delay.

8. The optical switching system according to claim 7, wherein the switch controller is implemented by a circuit.

9. The optical switching system according to claim 7, wherein the switch controller is implemented by an application-specific integrated circuit (ASIC) on a chip or field-programmable gate array (FPGA).

10. The optical switching system according to claim 7, implemented in a data center network.

11. A server, comprising:

first and second network interface cards (NIC), each NIC having a label channel part configured for communication with a switch controller via a label channel, wherein the label channel is configured to deliver destination information of data packets carried by paired label packets to the switch controller from the NIC; and for each NIC, a data channel part configured for communication with an optical switch via a data channel, wherein the data channel is configured to simultaneously transmit data packets aggregated by the NIC to the optical switch from the NIC;

wherein the switch controller is configured to generate switch-enabling signals to configure the optical switch based on received label destination information; and wherein the optical switch is configured to send the data packets to a destination port; and wherein the server is configured to utilize the label channels to distribute a clock frequency and synchronization time from a master clock of the switch controller to the first and second NICs, measure a physical fiber transmission delay of the label channels, and compensate the received synchronization time with the measured physical fiber transmission delay.

12. The server according to claim 11, wherein the server is configured to be top of rack (ToR) of a server rack comprising multiple servers.

13. The server according to claim 11, wherein the NIC is associated with an Ethernet switch.

* * * * *